(12) United States Patent
Homeyer et al.

(10) Patent No.: US 6,280,691 B1
(45) Date of Patent: Aug. 28, 2001

(54) INDOOR AIR PURIFICATION SYSTEM

(75) Inventors: Stephen T. Homeyer, Arlington Heights; Joel Walenga, Arlington, both of IL (US); Carlos Cavalca, Newark, DE (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/052,375

(22) Filed: Mar. 31, 1998

Related U.S. Application Data

(60) Provisional application No. 60/042,558, filed on Mar. 31, 1997.

(51) Int. Cl.[7] .......................... B01D 53/00; B01D 53/34; F01N 3/10
(52) U.S. Cl. .......................... 422/122; 171/173; 171/177; 55/482.1; 55/485
(58) Field of Search .......................... 422/122, 120, 422/171, 177, 173; 55/486, 485, 482.1, 490.1, 490.2; 96/422, 126; 95/288

(56) References Cited

U.S. PATENT DOCUMENTS

| Re. 31,719 | 10/1984 | Sonetaka et al. ............... 502/63 |
|---|---|---|
| 3,457,040 | 7/1969 | Jennings et al. ............... 422/122 |
| 3,469,934 | 9/1969 | Bocard et al. ............... 422/122 |
| 3,672,824 | 6/1972 | Tamura et al. ............... 423/247 |
| 3,691,346 | 9/1972 | Dyre et al. ............... 392/485 |
| 3,779,710 | 12/1973 | Burstein et al. ............... 422/121 |
| 3,804,942 | 4/1974 | Kato et al. ............... 422/4 |
| 3,883,637 | 5/1975 | Benedict ............... 429/104 |
| 3,949,056 | 4/1976 | Nakshbendi ............... 423/210 |
| 3,972,678 | 8/1976 | Nakshbendi ............... 422/122 |
| 3,973,927 | 8/1976 | Furchner et al. ............... 95/3 |
| 4,113,439 | 9/1978 | Ookubo et al. ............... 62/160 |
| 4,138,220 | 2/1979 | Davies et al. ............... 422/173 |
| 4,911,894 | 3/1990 | Retallick et al. ............... 422/174 |
| 5,009,869 | 4/1991 | Weinberg et al. ............... 95/187 |
| 5,207,877 | 5/1993 | Weinberg et al. ............... 95/154 |
| 5,212,131 | 5/1993 | Belding ............... 55/524 |
| 5,221,520 | 6/1993 | Cornwell ............... 422/122 |
| 5,236,476 | 8/1993 | Klick ............... 96/399 |
| 5,252,299 | 10/1993 | Retallick ............... 422/174 |
| 5,256,400 | 10/1993 | Froix et al. ............... 424/45 |
| 5,354,540 | 10/1994 | Neumiller ............... 422/174 |
| 5,447,693 | 9/1995 | Ohta et al. ............... 422/177 |
| 5,510,063 | 4/1996 | Gadkaree et al. ............... 95/901 |
| 5,510,116 | 4/1996 | Froix et al. ............... 424/486 |
| 5,632,954 | 5/1997 | Coellner et al. ............... 422/4 |

*Primary Examiner*—Hien Tran
(74) *Attorney, Agent, or Firm*—William J. Zak, Jr. Esq.

(57) ABSTRACT

The present invention relates to a system for indoor air purification system to and particularly to a system for removing particulates, biologicals, and gaseous chemical contaminates through the use of low room temperature catalysts, a closed cycle heat exchanger a HEPA filter and polisher for removing $NO_x$ and $SO_x$ from the air flow.

13 Claims, 2 Drawing Sheets

INDOOR AIR PURIFICATION SYSTEM

This patent application claims the benefit under 35 USC § 119 of U.S. provisional patent application Ser. No. 60/042,558 filed on Mar. 31, 1997.

The present invention relates to a system for indoor air purification to and particularly to a system for removing particulates, biologicals, and gaseous chemical contaminates through the use of low and room temperature catalysts.

BACKGROUND OF THE INVENTION

There are a plethora of indoor air purification devices currently on the market; however, these devices (e.g. mechanical filters, electronic air cleaners, ion generators, etc.) focus on the removal of airborne particulates. The conceptual indoor air purification system has been designed to address the recent air quality problems associated with gaseous chemical contamination which has become more of a problem in recent years due in part to inadequate ventilation, chemical pollutants from indoor sources and chemical contaminants from outdoor sources. New "tight" buildings and increased energy costs have led to a significant reduction in the amount of outdoor air provided for ventilation which results in the accumulation of indoor air pollutants.

It is well documented that volatile organic compounds (e.g. formaldehyde, etc.) are released from adhesives, pesticides, cleaning agents etc. The so called "Sick Building Syndrome" is commonly found in new buildings where carpet adhesives are still emitting harmful compounds. Carbon monoxide emissions from fireplaces, gas stoves, space heaters, and faulty furnaces (and smoking) are considered a significant problem in the northern climates and many major cities are passing ordinances requiring carbon monoxide detectors in single and multifamily homes. Ventilation with the polluted outdoor air in major metropolitan areas (e.g. motor-vehicle emissions, and smog (ozone) reduces the quality of indoor air.

Purification of air that is polluted with the above mentioned types of gaseous chemical contaminates can be accomplished through the use of adsorbents or catalysts. Effective clean-up of indoor air can require several beds of different types of adsorbents that will have capacity limitations. In contrast, catalysts can affect the continuous removal/destruction of a wide range of malodorous/harmful organic compounds, carbon monoxide, and ozone. However, standard air purification catalysts often operate at relatively high temperatures, which has discouraged their use in indoor air purification.

Sick Building Syndrome (SBS) and other related air quality issues have promoted a series of recent studies by the EPA and other agencies which suggest that the indoor air purification market can be immense. For example, the adverse effect of poor office air quality on employee productivity was estimated to cost industry "in the tens of billions of dollars per year" (*EPA Report to Congress on Indoor Air Quality*, 1989).

Competitive units do not use catalyst technology for control of gaseous chemical contaminates (they typically are particulate removal devices). U.S. Pat. No. 4,138,220 (1979) to Davies, et. al. discloses forcing air through a heat exchanger to preheat the contaminant-laden air, preheating it with electrical heaters to a reaction temperature in the range of 357°–475° F., passing the heated air across catalytic units, and discharging the converted air through a heat-exchanger. U.S. Pat. No. 5,447,693 (1995) to Ohta et al. uses the heat exchanger fins of an air conditioner that are coated with a catalyst. In the cool mode, contaminants adsorb to the coated fin; in the hot mode, they react and desorb. U.S. Pat. No. 5,252,299 (1993), to Retallick does not use forced air but instead uses two strips to form counter current spiral paths around a heated converter.

In contrast, our application is the commercial or residential setting, where the application includes, but is not limited to, odor-causing compounds such as sulfur, oxygen, or nitrogen containing compounds, and carbon monoxide, and ozone. Our system may operate over a large temperature range depending on how it is implemented (recycle or once-through mode).

The invention accordingly comprises the features of construction, combination of elements, and arrangement of parts, all as detailed below, and the scope of the invention will be indicated in the claims.

BRIEF DESCRIPTION OF THE DRAWINGS

Further detail and a fuller understanding of the nature and objects of the invention, may be had with reference to the following Detailed Description, taken in conjunction with the accompanying drawings in which corresponding reference numerals refer to similar parts throughout and the illustrations of which are briefly described as follows.

DETAILED DESCRIPTION

Figure 1:
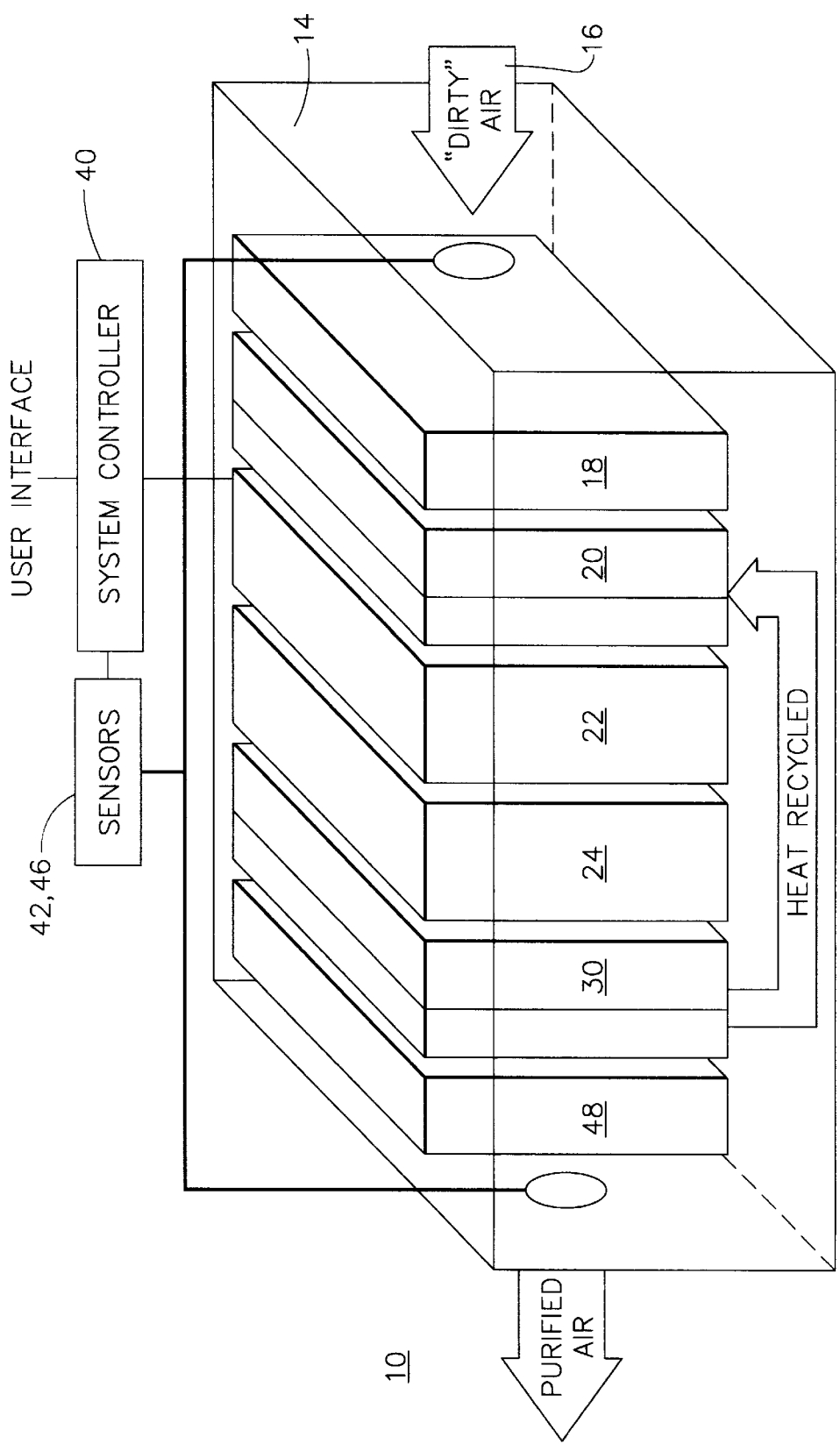
FIG. 1 is a schematic illustration of a indoor air purification system in accordance with the present invention.
Figure 2:
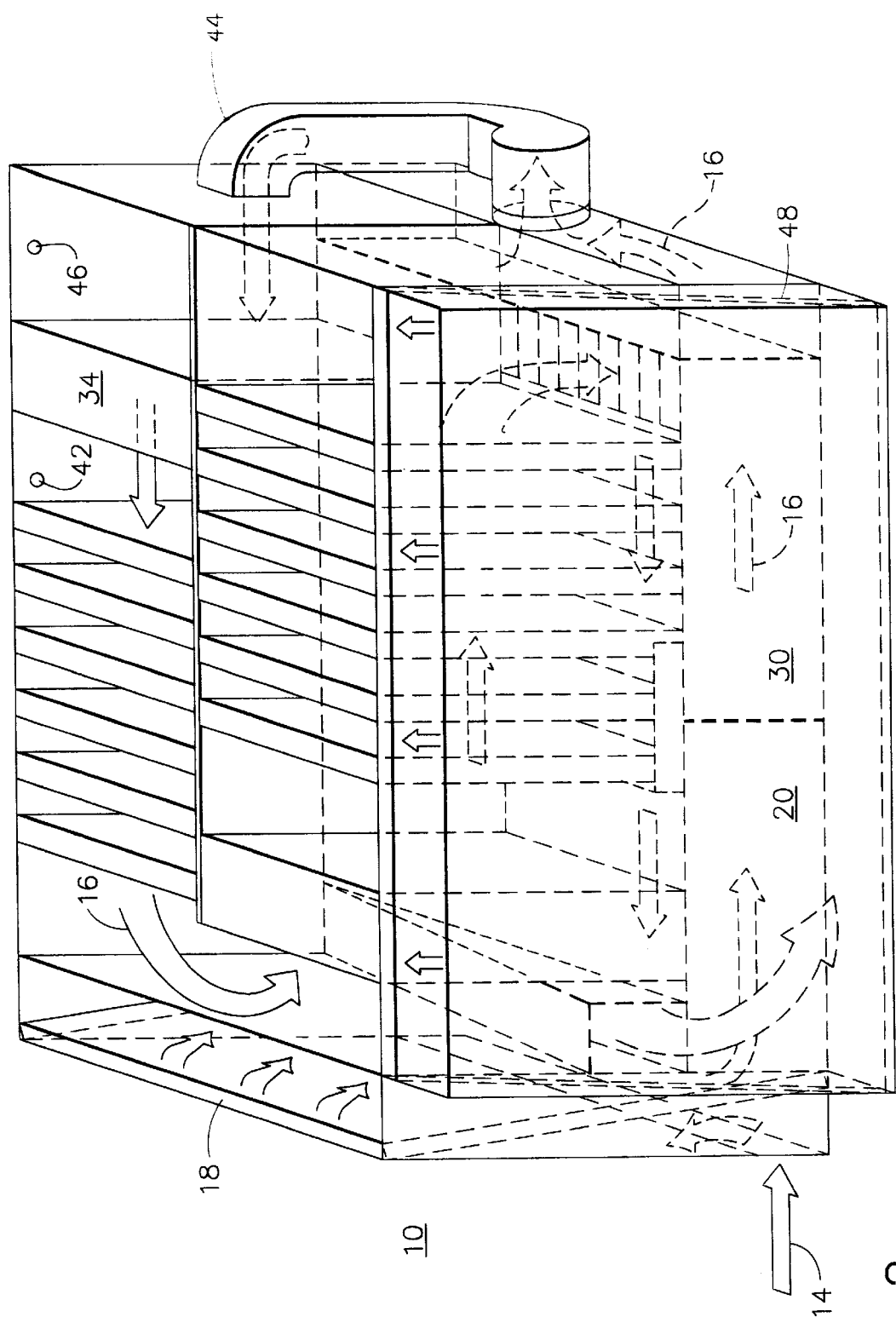
FIG. 2 is an illustration of an idealized indoor air purification system illustrating a proposed air flow through the various components.

As mentioned in the preceding section, conventional indoor air purification devices only remove particulates. The present invention can remove particulates and additionally treats biologicals, and gaseous chemical contaminates. Referring now to the system illustrated in FIG. 1, the system 10, which includes a housing, can employ an inlet 14 for delivering a flow of contaminated air 16 to be treated. The size and orientation of the inlet can influence systems performance. A first low backpressure filter 18 such as a HEPA filter for removes fine particulates such as smoke, and biologicals from the air flow can be positioned proximate the inlet 14 for removing particulates from the air flow 16. An inlet heat exchanger 20 for increasing the temperature of the inlet air flow 16 to a first temperature preferable in the range 250–350° F. A first low temperature oxidation catalyst 22 is coupled to the exhaust of the inlet heat exchanger 20 for receiving the air flow thereto across. In a chemical reaction the oxidation catalyst 22 removes hydrocarbons from the air flow. A second low temperature ozone decomposition catalyst 24 follows the oxidation catalyst 22 for receiving the air flow thereto across and removing ozone from the air flow or contaminated air 16. In a chemical reaction the ozone decomposition catalyst 24 decomposes ozone into oxygen. An outlet heat exchanger 30 follows the ozone decomposition catalyst 24 for receiving the air flow 16 therethrough capturing heat from the heated and catalytically treated air thereby reducing the temperature of the outlet air flow to a second temperature in the range of 20–100° F. The transfer circuit of the outlet heat exchanger 30 is preferably flow coupled to the transfer circuit of inlet heat exchanger 20 for transferring heat from the out heat exchanger to the inlet heat exchanger 20 to conserve heat energy. The system preferably uses high efficiency heat exchangers such as having an efficiency of at least 65% or more. It is also recognized the heat exchanger and/or heater combination can be implemented as a heat pump.

The indoor air purification system 10 preferably includes a controllable electronic heater 34 for supplying heat to the first heat exchanger 20 to maintain the air flow 16 exiting the inlet heat exchanger 20 within the desired operating temperature range. The indoor air purification system preferably includes an electronic control system 40 for maintaining the temperature of the inlet heat exchanger 20 and thus the catalytic operating temperature within a desired operating temperature range. The control system 40 can include a control unit coupled to and controlling the heater 34. One or more temperature sensors 42 coupled to the control unit 40 can be disposed in the air flow 16 proximate the catalysts 22 and 24 for sensing the operating temperature of the converter air. The sensor 42 supplies information indicative of the sensed temperature to the control unit 40 and in turn the control unit 40, in response to the information indicative of the sensed temperature, preferably controls power to the heater to adjust the heater output to maintain the exhaust temperature of the inlet heat exchanger 20 within a desired operating temperature range.

The indoor air purification system 10 can further preferably include a blower 44 for establishing an air flow 16 through the system 10 for pressurized transport of the air flow 16 through the first heat exchanger 20, over the first and second catalysts 22 and 24 respectively and through the outlet heat exchanger 30. The blower 44 can also be electronically controlled to regulate the flow of air through the system 10 to maintain the airflow within desired operating flow ranges, that is within the conversion limits of the limit of first and second catalytic converters 22 and 24 respectively. More particularly, an airflow sensor 46 coupled to the control unit 40 and disposed in the air flow proximate a catalytic converter for sensing the movement of the air flow over the converter, the sensor supplying information indicative of the airflow to the control unit 40; the control unit 40, in response to the information indicative of the air flow, controlling the blowers to maintaining system air flow within a desired operating temperature range.

The indoor air purification system 10 can further include a polisher stage that is an adsorbent for $NO_x$ and $SO_x$ type gases that are generally considered as precursors for acid gas. A polisher 48 can be coupled to the exhaust of the second heat exchanger 30 for receiving the reduced temperature air flow 16 and for removing $NO_x$ and $SO_x$ from the air flow 16.

Low temperature catalysts that are particularly advantageous for treating hydrocarbon-based gases in the system of the present invention include platinum on alumina catalysts that have been produced from sulfur containing salt. Low temperature catalysts that are preferred for converting ozone include palladium or silver based catalysts. It is preferred that these catalysts are formed as monolithic structures in which the catalyst is spread on a solid support such as a metal or ceramic honeycomb.

Technical issues include excessive weight and volume and heat loss of the reactor to the room, causing temperature rise and requiring a cooling unit. Optimal catalyst configuration must be determined to minimize cost and size.

Many applications can be envisioned where a stand-alone table-top scale air purifier is preferred. In this case, cooling of the outlet air via a heat pump mechanism is impractical. Therefore, the smaller stand alone unit must process/purify air without significantly raising the temperature in the room. A series of design/trade-off calculations were performed for the purification of polluted air in a small. These studies lead to the sizing of a unit which will provide for clean-up of 60% of the polluted air with minimal temperature rise.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. An indoor air purification system comprising:
   a blower for establishing a flow of air through the system;
   an oxidation catalyst for removing contaminants from the air;
   a heat exchanger for heating the air prior to catalytic removal of contaminants by the oxidation catalyst and for cooling the air after the catalytic removal of contaminants by the oxidation catalyst;
   an airflow sensor for sensing the movement of the air over the oxidation catalyst; and
   a control unit, responsive to the airflow sensor, for controlling the blower to maintain system air flow within an operating temperature range.

2. The indoor air purification system of claim 1 further including a polisher for removing NOx and SOx from air leaving the heat exchanger.

3. The indoor air purification system of claim 1 further comprising a controllable heater for supplying heat to the heat exchanger to further heat the air prior to catalytic removal.

4. The indoor air purification system of claim 3 further comprising:
   a control unit for controlling the heater; and
   a temperature sensor for sensing the temperature of the air flowing over the catalyst, the sensor supplying information indicative of the sensed temperature to the control unit; the control unit, in response to the information indicative of the sensed temperature, controlling the heater to maintain the oxidation temperature within a temperature range.

5. The indoor air purification system of claim 1 further comprising an air filter for filtering particles from air before the air is heated in the heat exchanger.

6. The indoor air purification system of claim 5 wherein the air filter is adjacent an inlet of the heat exchanger.

7. The indoor air purification system of claim 1 wherein the heat exchanger heats the air prior to catalytic removal to a temperature in the range of 250–350° F. and cools the air after catalytic removal to a temperature in the range of 20–100° F.

8. The indoor air purification system of claim 1 wherein the oxidation catalyst includes platinum on alumina.

9. An indoor air purification system for treating inlet air, the system comprising:
   a housing;
   an inlet heat exchanger for heating the inlet air to a temperature between 250° F. and 350° F.;
   an oxidation catalyst operable between 250° F. and 350° F. for performing catalytic removal of contaminants in the air heated by the inlet heat exchanger;
   an ozone decomposition catalyst for removing ozone from the air following the catalytic removal; and
   an outlet heat exchanger for reducing the temperature of the air to between 20° F. and 100° F. following the ozone removal;

the outlet heat exchanger supplying heat to the inlet heat exchanger;

the heat exchangers and the catalysts being contained within the housing.

10. The indoor air purification system of claim 9 further comprising a blower contained within the housing for establishing a flow of the air through the system.

11. The indoor air purification system of claim 10 further comprising an electronic control system for maintaining the system airflow within an operating flow range, the electronic control system including:

a control unit for controlling the blower; and an airflow sensor coupled to the control unit and disposed in the air flow for sensing the movement of the air over the oxidation catalyst, the sensor supplying information indicative of the airflow to the control unit;

the control unit, in response to the information indicative of the air flow, controlling the blower to maintain system air flow within an operating temperature range.

12. The indoor air purification system of claim 9 wherein the housing is table-top sized.

13. The indoor air purification system of claim 9 wherein the oxidation catalyst includes platinum on alumina.

* * * * *